(12) United States Patent
Xi et al.

(10) Patent No.: US 8,441,995 B2
(45) Date of Patent: May 14, 2013

(54) METHOD, SYSTEM AND APPARATUS FOR SUPPORTING ADDRESSING BY USER STATIC IP ADDRESS IN LTE SYSTEM

(75) Inventors: Jiande Xi, Beijing (CN); Guosheng Zhao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 289 days.

(21) Appl. No.: 12/677,746

(22) PCT Filed: Sep. 11, 2008

(86) PCT No.: PCT/CN2008/072331
§ 371 (c)(1),
(2), (4) Date: Mar. 11, 2010

(87) PCT Pub. No.: WO2009/036690
PCT Pub. Date: Mar. 26, 2009

(65) Prior Publication Data
US 2010/0202351 A1  Aug. 12, 2010

(30) Foreign Application Priority Data

Sep. 14, 2007 (CN) .......................... 2007 1 0121827

(51) Int. Cl.
*H04W 4/00* (2009.01)
(52) U.S. Cl.
USPC ............................ 370/329; 455/436; 455/450
(58) Field of Classification Search ........................ None
See application file for complete search history.

(56) References Cited

U.S. PATENT DOCUMENTS

| 2006/0034213 | A1* | 2/2006 | Munje et al. | 370/328 |
| 2007/0213060 | A1  | 9/2007 | Shaheen | |
| 2008/0316972 | A1* | 12/2008 | Shaheen | 370/331 |
| 2009/0052384 | A1* | 2/2009 | Zisimopoulous et al. | 370/329 |
| 2009/0305707 | A1* | 12/2009 | Pudney | 455/445 |

FOREIGN PATENT DOCUMENTS

| CN | 1960565 A | 5/2007 |
| KR | 20020052499 A | 7/2002 |

* cited by examiner

*Primary Examiner* — Jianye Wu (57) ABSTRACT

Embodiments of the present invention provide a method, system and relevant apparatuses for supporting addressing by a user static Internet Protocol (IP) address in a Long Term Evolution (LTE) system. The method includes: when a user attaches to a network, downloading, by a Home Subscriber Server (HSS), user subscription data including a user static IP address and information of a corresponding Access Point Name (APN) to a Mobility Management Entity (MME); sending, by the MME, the user static IP address and the information of the corresponding APN to a Serving Gateway (S-GW) through a Create Default Bearer Request message; sending, by the S-GW, the user static IP address, the information of the corresponding APN and an address of an S-GW serving the user to a Packet Data Network Gateway (P-GW) corresponding to the APN which corresponds to the user static IP address; and establishing, by the P-GW, a default bearer according to the user static IP address, the information of the corresponding APN and the address of the S-GW serving the user. The present invention solves the packet data addressing problem of the user static IP address in a simple manner. The procedure is simple and convenient for use and has better applicability.

23 Claims, 5 Drawing Sheets

METHOD, SYSTEM AND APPARATUS FOR SUPPORTING ADDRESSING BY USER STATIC IP ADDRESS IN LTE SYSTEM

CROSS-REFERENCE TO RELATED APPLICATIONS

This application is a U.S. National Stage Application of International application No. PCT/CN2008/072331, filed Sep. 11, 2008. This application claims the benefit of Chinese Application No. 200710121827.8, filed Sep. 14, 2007. The disclosures of the above applications are incorporated herein by reference.

FIELD OF THE TECHNOLOGY

The present invention relates to communications techniques, and more particularly, to method, system and relevant apparatuses for supporting addressing by a user static IP address in a Long Term Evolution (LTE) system.

BACKGROUND OF THE INVENTION

According to requirements of system evolution requirement specification of third Generation Partnership Project (3GPP) Long Term Evolution/System Architecture Evolution (LTE/SAE), a communication system needs to support normal service functions when a user uses a static Internet Protocol (IP) address, especially needs to support data interactions when the user connects to a Private Packet Data Network (PDN) with an IP bearer. However, at present, there is no solution for supporting addressing by the user static IP address in the 3GPP LTE/SAE system.

SUMMARY OF THE INVENTION

Embodiments of the present invention provide a method and system for supporting addressing by a user static IP address in a Long Term Evolution (LTE) system, a Mobility Management Entity (MME), a Serving Gateway (S-GW) and a Packet data network Gateway (P-GW), so as to solve the packet data addressing problem when session parties interact with each other by the user static IP address in the LTE system.

According to an embodiment of the present invention, a method for supporting addressing by a user static IP address in an LTE system is provided. The method includes:

when a user attaches to a network, downloading, by a Home Subscriber Server (HSS), user subscription data comprising a user static IP address and information of a corresponding Access Point Name (APN) to an MME;

sending, by the MME, the user static IP address and the information of the corresponding APN to an S-GW through a Create Default Bearer Request message;

sending, by the S-GW, the user static IP address, the information of the corresponding APN and an address of an S-GW serving the user to a P-GW corresponding to the APN which corresponds to the user static IP address; and establishing, by the P-GW, a default bearer according to the user static IP address, the information of the corresponding APN and the address of the S-GW serving the user.

According to another embodiment of the present invention, a system for supporting addressing by a user static IP address in an LTE system is provided. The system includes:

a Home Subscriber Server (HSS), adapted to download, when a user attaches to a network, user subscription data comprising a user static IP address and information of a corresponding APN to an MME;

the MME, adapted to send the user static IP address and the information of the corresponding APN to an S-GW through a Create Default Bearer Request message;

the S-GW, adapted to send the user static IP address, the information of the corresponding APN and an address of an S-GW serving the user to a P-GW corresponding to the APN; and the P-GW, adapted to establish a default bearer according to the user static IP address, the information of the corresponding APN and the address of the S-GW serving the user.

According to still another embodiment of the present invention, an MME, an S-GW and a P-GW in the system for supporting addressing by the user static IP address in the LTE system are provided.

The MME includes: a first module, adapted to download user subscription data comprising a user static IP address and information of a corresponding APN from an HSS; and a second module, adapted to send the user static IP address and the information of the corresponding APN to an S-GW through a Create Default Bearer Request message.

The S-GW includes: a first module, adapted to receive a user static IP address and information of a corresponding APN from an MME, and a second module, adapted to send the user static IP address, the information of the corresponding APN and an address of an S-GW serving a user to a P-GW corresponding to the APN which corresponds to the user static IP address.

The P-GW includes: a first module, adapted to establish a default bearer according to a user static IP address, information of a corresponding APN and an address of an S-GW serving the user received from the S-GW.

By making use of the network architecture characteristics of the current 3GPP LTE/SAE system, the present invention solves the packet data addressing problem when session parties interact with each other by the user static IP address. The procedure is simple and convenient for use, and has better applicability.

BRIEF DESCRIPTION OF THE DRAWINGS

The following drawings are used for facilitating understanding of the present invention and form one part of the present invention. The exemplary embodiments and descriptions of the present invention are only used for describing the present invention, but are not used for unduly restricting the present invention. In the drawings.

EMBODIMENTS OF THE INVENTION

The present invention will be described in detail hereinafter with reference to accompanying drawings and embodiments to make the objectives, technical solution and merits therein clearer.

In a 3GPP LTE/SAE system, there are generally two manners for allocating a user static IP address. One is to allocate the user static IP address to a user fixedly when the user subscribes to a Home Public Land Mobile Network (HPLMN) operator. The other is to allocate a dedicated user static IP address, i.e., a PDN address in a subscription data entry, to the user by a PDN operator from its PDN address pool. Such PDN is usually a dedicated network. The user static IP addresses allocated by the above two manners are both stored in the Home Subscriber Server (HSS) and the User Equipment (UE), e.g. a Subscriber Identity Module/Universal Subscriber Identity Module (SIM/USIM) card of the UE. These kinds of IP addresses are also referred to as user subscribed IP addresses. As to an International Mobile Subscriber Identity (IMSI) of a user, there may be zero, one or more user static IP addresses for each IP type. The user static IP address may be applied in the following scenarios: UEs acquiring the user static IP addresses have specific communication requirements (if the IP address is different each time activated, communication cannot be implemented); the UE acquiring the user static IP address represents certain information (data transmitted from an IP address reflects sampling information at a fixed spot, e.g. atmosphere sampling).

Figure 1:
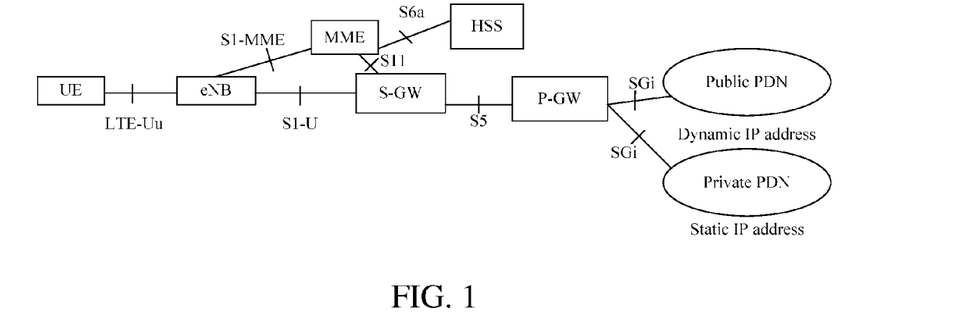
FIG. 1 is a schematic diagram illustrating usage of a user static IP address in a single-PDN scenario.
Figure 2:
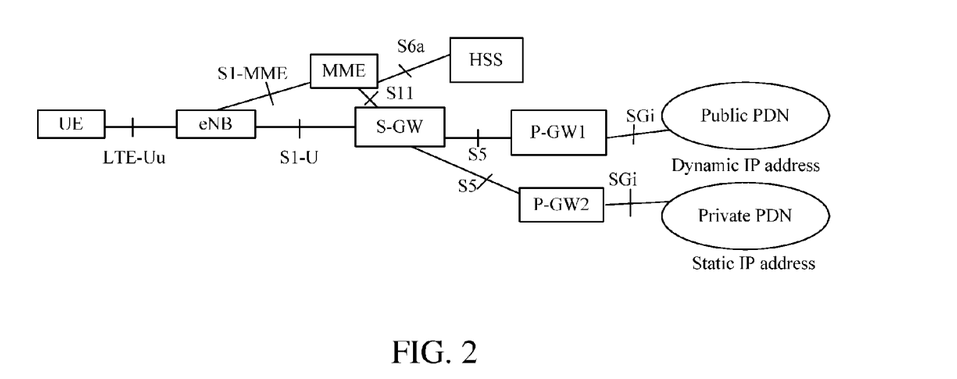
FIG. 2 is a schematic diagram illustrating usage of a user static IP address in a multiple-PDNs scenario.

Embodiments of the present invention provide a solution for supporting addressing by a user static IP address in the 3GPP LTE/SAE system, applicable for the following two kinds of UEs: one is a UE capable of connecting to a single PDN, as shown in FIG. 1. This kind of UE supports only one PDN connection and does not establish IP bearer connection for the user static IP address after registration in the network. The other is a UE capable of connecting to multiple PDNs, as shown in FIG. 2. This kind of UE is able to support at least two PDN connections but also does not establish IP bearer connection for the user static IP address after registration in the network. The method is also applicable for scenarios where the UE establishes an IP bearer connection for user static IP address when attaches in the network.

Figure 3:
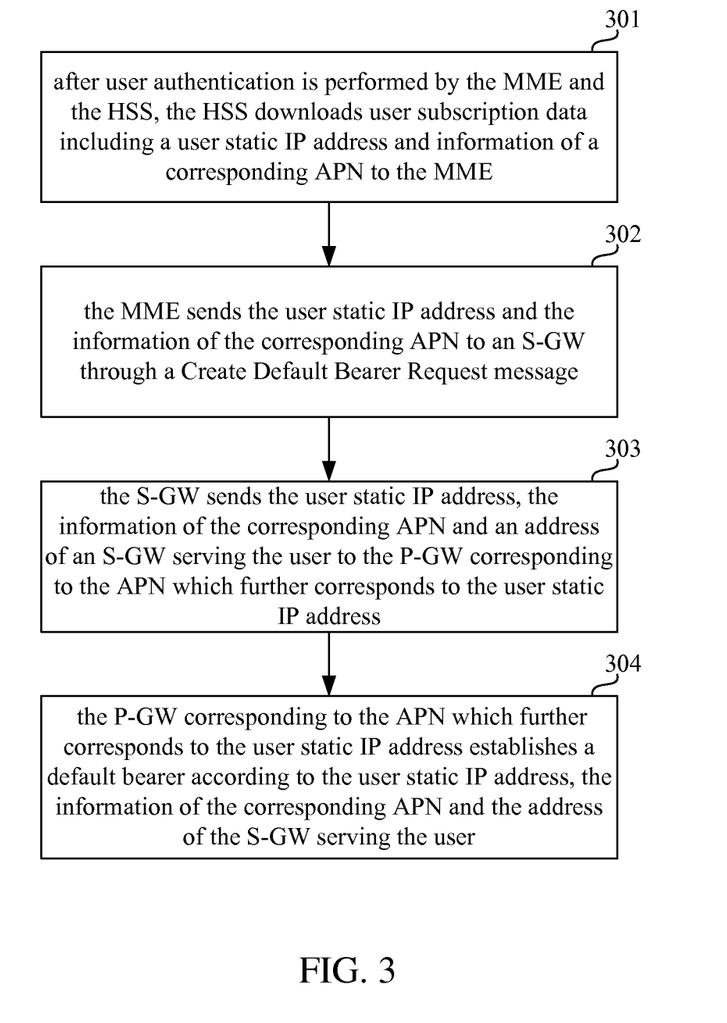
FIG. 3 is a flowchart illustrating a method for supporting addressing by a user static IP address in an LTE system according to an embodiment of the present invention.

According to characteristics of the 3GPP LTE/SAE network architecture, the embodiments of the present invention provide a method for supporting addressing by the user static IP address in the 3GPP LTE/SAE system. The method is shown in FIG. 3, mainly including the following blocks:

301, when a UE registers in the network and after user authentication is performed in the MME and the HSS, the HSS downloads user subscription data including a user static IP address and information of a corresponding Access Point Name (APN) to the MME.

In the 3GPP LTE/SAE system, when the UE registers in the network, the MME which is in charge of user mobility management performs a user identity interactive authentication procedure with the HSS firstly. After the authentication succeeds, the HSS downloads the user subscription data to the MME. The MME stores the downloaded subscription data to perform subsequent processing, e.g., bearer establishment.

In this embodiment, the user subscription data downloaded by the MME from the HSS includes, besides IMSI and information of the default APN, the subscribed user static IP address (or a user static IP address list) and information of the APN corresponding to the user static IP address. Different user static IP addresses may use the same or different APNs. If multiple user static IP addresses use the same APN, it indicates that these user static IP addresses connect to a corresponding PDN through the same APN. If the multiple user static IP addresses correspond to different APNs, it indicates that these user static IP addresses connect to the corresponding PDN through different APNs. In some circumstances, the default APN is the APN corresponding to the user static IP address.

302, the MME sends the user static IP address, the information of the corresponding APN, an address of a P-GW corresponding to the APN to an S-GW through a Create Default Bearer Request.

In this block, after the user subscription data is downloaded to the MME, the MME needs to firstly analyze the information of the APN corresponding to the user static IP address, so as to obtain the address of the P-GW corresponding to the APN which further corresponds to the user static IP address. Then the MME initiates a Default Bearer establishment procedure, and sends the downloaded user static IP address, the information of the corresponding APN, the address of the P-GW corresponding to the APN which further corresponds to the user static IP address in the Create Default Bearer Request to the S-GW, in which the address of the P-GW is obtained after analyzation.

303, the S-GW sends the received user static IP address, the information of the corresponding APN and an address of an S-GW serving the user to the P-GW corresponding to the APN of the user static IP address.

In this embodiment of the present invention, the Create Default Bearer Request sent by the MME to the S-GW may further include information of a default APN. At this time, this block may include:

3031, the S-GW compares the received information of the APN corresponding to the user static IP address with the information of the default APN.

3032, if the APN corresponding to the user static IP address is the same as the default APN, or there is only the default APN in the Create Default Bearer Request, the S-GW sends the user static IP address, the information of the corresponding APN and the address of the S-GW serving the UE to the P-GW corresponding to the default APN through the Create Default Bearer Request. At this time, the P-GW corresponding to the default APN stores the received user static IP address, the information of the corresponding APN and the address of the S-GW serving the UE for establishing the default bearer.

3033, if the APN corresponding to the user static IP address is different from the default APN, the S-GW sends the user static IP address, the information of the corresponding APN and the address of the S-GW serving the UE to the P-GW corresponding to the APN which further corresponds to the user static IP address through a Notification Private Context Request message or a Create Default Bearer Request message. At this time, the P-GW stores the user static IP address, the information of the corresponding APN and the address of the S-GW serving the UE for establishing the default bearer.

304, the P-GW corresponding to the APN which further corresponds to the user static IP address establishes the default bearer according to the user static IP address, the information of the corresponding APN and the address of the S-GW serving the user.

In this block, after the P-GW corresponding to the APN which further corresponds to the user static IP address establishes the default bearer according to the user static IP address, the information of the corresponding APN and the address of the S-GW serving the UE, it is also required to create context corresponding to the user static IP address. The context includes information, such as the user static IP address, the information of the corresponding APN and the address of the S-GW serving the user, etc. Then the P-GW notifies the user static IP address, the information of the corresponding APN to the UE by a Create Default Bearer Response message via the S-GW and the MME.

Through the above blocks 301-304, when downlink packet data destined for the user static IP address arrives at the P-GW, the P-GW firstly checks whether a default bearer corresponding to the user static IP address has been established. If the default bearer has been established and is able to meet Quality of Service (QoS) requirement of the downlink packet data, the P-GW forwards the downlink packet data to the default bearer for transmission. If no available bearer is found, the P-GW further initiates a procedure for establishing a dedicated bearer.

In another embodiment of the present invention, in block 301, the user subscription data downloaded by the HSS to the MME further includes the address of the P-GW corresponding to the APN which further corresponds to the user static IP address. Then in block 302, the MME does not need to perform the block of analyzing the received information of the corresponding APN. Instead, the MME directly sends the user static IP address, the information of the corresponding APN and the address of the P-GW corresponding to the APN to the S-GW.

In still another embodiment of the present invention, in block 302, the Create Default Bearer Request sent by the MME to the S-GW does not carry the address of the P-GW corresponding to the APN which further corresponds to the user static IP address. At this time, in block 303, the S-GW needs to firstly query a Domain Name Server (DNS) according to the information of the corresponding APN. The DNS analyzes the information of the corresponding APN, so as to obtain the address of the P-GW corresponding to the APN which further corresponds to the user static IP address. Then the received user static IP address, the information of the corresponding APN and the address of the S-GW serving the user are sent to the P-GW corresponding to the APN which further corresponds to the user static IP address.

The above embodiments provide a method for supporting addressing by the user static IP address in the 3GPP LTE/SAE system. Accordingly, procedures, such as a user de-register procedure, an S-GW relocation procedure and a Tracking Area (TA) Update (TAU) procedure with S-GW change, etc, in the 3GPP LTE/SAE system need to be improved.

In the user de-register procedure, the MME firstly determines whether a bearer corresponding to the user static IP address was established, and determines whether to carry the user static IP address in a delete bearer request sent to the S-GW according to a determined result of whether the bearer corresponding to the user static IP address was established. Specifically speaking, if the bearer corresponding to the user static IP address was established, the MME doesn't need to carry the user static IP address in the delete bearer request sent to the S-GW. Instead, the MME directly notifies the S-GW and the P-GW, through carrying a Tunnel Endpoint Identifier (TEID) corresponding to the bear or a TEID list corresponding to the bearers in the delete bearer request sent to the S-GW, that it is required to delete context of the bearer(s) identified by the TEID or the TEID list. Otherwise, the MME needs to carry the user static IP address in the delete bearer request sent to the S-GW, and notifies the corresponding S-GW and the P-GW that it is required to delete the context related to the user static IP address. After receiving the delete bearer request, the P-GW deletes the context related to the user static IP address according to the user static IP address or the TEID or the TEID list.

In the S-GW relocation procedure and the TAU procedure with S-GW change, the MME firstly sends the user static IP address and the information of the corresponding APN to the S-GW through a Create Default Bearer Request. After receiving the Create Default Bearer Request, if the APN corresponding to the user static IP address is the same as the default APN, the S-GW triggers an update bearer request procedure to the P-GW corresponding to the APN which further corresponds to the user static IP address, notifies the P-GW that the S-GW currently serving the UE has changed, so as to update context information stored in the P-GW. If the APN corresponding to the user static IP address is different form the default APN, the S-GW triggers an update bearer request procedure or triggers a Notification Private Context Request procedure to the P-GW corresponding to the APN which further corresponds to the user static IP address, notifies the P-GW that the address of the S-GW currently serving the UE has changed, so as to update the context information stored in the P-GW. The P-GW will store the updated address of the S-GW currently serving the UE, so as to facilitate addressing of subsequent downlink packet data using the user static IP address.

It should be noted that, the above method for supporting addressing by the user static IP address in the 3GPP LTE/SAE system is applicable for addressing of downlink packet data when the UE accesses to the 3GPP Evolved Packet System (EPS) core network through a 3GPP Evolved Universal Terrestrial Radio Access Network (E-UTRAN) access system, and is also applicable for addressing of downlink packet data when the UE accesses to the 3GPP EPS core network through a non-3GPP access system.

The 3GPP access system refers to Global System for Mobile communication (GSM) EDGE Radio Access Network (GERAN) access system, Universal Terrestrial Radio Access Network (UTRAN) access system and E-UTRAN access system. The non-3GPP access system refers to Code-Division Multiple Access 2000 (CDMA2000) and subsequent evolved system, Wimax access system, Next Generation Network (NGN) system, and Wireless Local Area Network (WLAN) access system, etc. The non-3GPP access system is connected with the P-GW through its Access Gateway (A-GW). As to the CDMA2000 system, the A-GW refers to a Packet Data Serving Node (PDSN). As to the Wimax system, it refers to an ASN A-GW. As to the WLAN, it refers to an evolved Packet Data Gateway (ePDG).

Hereinafter, the registration of the UE in the network through the 3GPP E-UTRAN access system will be taken as an example for description.

Figure 4:
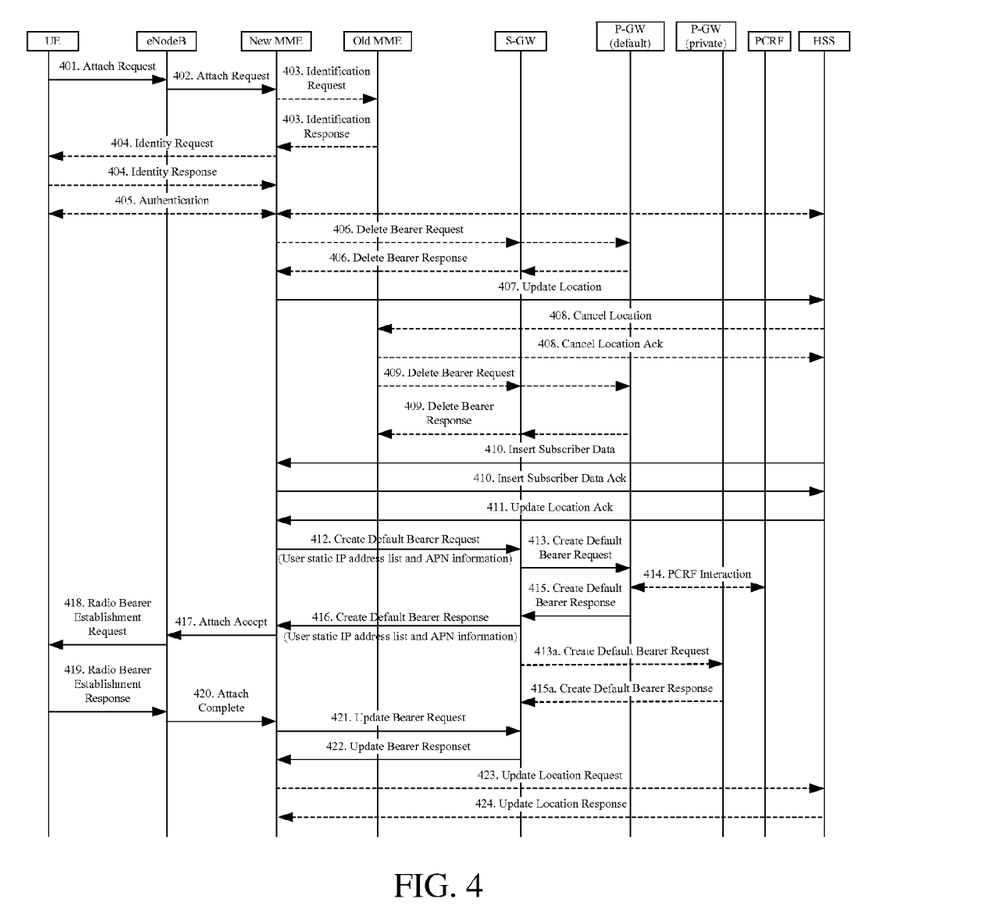
FIG. 4 is a schematic diagram illustrating a user network registration procedure according to an embodiment of the present invention.

FIG. 4 shows a network register procedure of a user according to an embodiment of the present invention with respect to the scenario of multiple PDN connections where different P-GWs serve different PDNs. The P-GW (default) is the P-GW used by Default Bearer, whereas the P-GW (private) is the P-GW used by non-Default Bearer. Supposing that in the LTE/SAE system, there is only one Default Bearer per UE per APN, and one APN corresponding to the user static IP address also has only one Default Bearer. If the default APN is the same as the APN corresponding to the user static IP address, the establishment procedure of only one Default Bearer is performed. The detailed network register (attach) procedure of user is as follows:

401, the UE initiates the attach procedure by sending, to the eNodeB, an Attach Request including parameters such as an IMSI or an S-Temporary Mobile Subscriber Identity (S-TMSI) of the UE, old Tracking Area Identity (TAI), UE network capability, PDN address allocation information, and network indication, etc.

402, after obtaining information of the MME from the S-TMSI and the network indication, the eNodeB forwards the received Attach Request to the MME.

403, if the Attach Request contains the S-TMSI and the MME has changed, a new MME needs to send an Identification Request to the old MME to request the IMSI. The old MME responds with an Identification Response.

404, if neither the old MME nor the new MME identifies the UE, the new MME sends an Identity Request to the UE to request the IMSI. The UE responds with an Identity Response.

405, if no UE context for the UE exists anywhere in the network, user identity Authentication is mandatory. Otherwise, this block is optional.

406, if there are active bearer context in the new MME, GWs involved are notified to delete these bearer context. Specifically speaking, the notification is accomplished by interaction of Delete Bearer Request and Delete Bearer Response.

407, if the MME has changed since last detach or it is the first time for attach, the MME sends an Update Location message carrying an MME identity and the IMSI to the HSS.

408, the HSS sends a Cancel Location message to the old MME to notify the old MME remove the MME context and the bearer context. The old MME acknowledges the HSS with a Cancel Location Ack.

409, if there are active bearer context in the old MME, the old MME notifies GWs involved to delete the bearer context. Specifically speaking, the notification is accomplished by interaction of Delete Bearer Request and Delete Bearer Response.

410, the HSS sends to the new MME an Insert Subscriber Data message including the IMSI and the subscription data, in which the subscription data includes information of the default APN, a user static IP address list and information of the corresponding APN. The new MME validates the UE's presence in the new TA. If all checks are successful, the new MME constructs context for the UE and returns an Insert Subscriber Data Ack to the HSS.

411, the HSS responds the new MME with an Update Location Ack message.

412, after selecting an S-GW, the new MME sends to the S-GW a Create Default Bearer Request including the IMSI, an MME context identifier, Radio Access Technology (RAT) type, default bearer QoS, P-GW address information, user static IP address and the information of the corresponding APN.

Herein, the new MME may respectively initiate a create default bearer procedure for the user static IP address and the corresponding APN, and for the default APN. It is also possible to create a default bearer context for them together.

The S-GW analyzes the received user static IP address list and the corresponding APN list. If the P-GW corresponding to the APN list is the same as the default P-GW, only blocks 413 and 415 will be performed and blocks 413a, 415a will be omitted. If the P-GW or the P-GW list corresponding to the APN list is different from the default P-GW, it is further required to perform blocks 413a and 415a.

Step 413, the S-GW creates a new entry in an Evolved Packet System (EPS) bearer table, stores the above information (IMSI, MME context identifier, RAT type, default bearer QoS, PDN address information, user static IP address and the information of the corresponding APN), and sends a Create Default Bearer Request to the default P-GW, in which the Create Default Bearer Request includes S-GW address for the user plane, S-GW Tunnel Endpoint identifier (TEID) of the user plane, S-GW TEID of the control plane, RAT type, default bearer QoS, the PDN address information, the user static IP address list and the information of the corresponding APN.

413a, the S-GW sends a Create Default Bearer Request to the APN (P-GW (private)) corresponding to the user static IP address, in which the Create Default Bearer Request includes the user static IP address, the address of the S-GW, and the APN information corresponding to the user static IP address.

414, if Policy Control and Charging Rules Function (PCRF) is deployed, the P-GW interacts with the PCRF (PCRF Interaction) to obtain default Policy Control and Charging rules (PCC rules).

415, the P-GW (default) returns a Create Default Bearer Response to the S-GW including P-GW address for the user plane, P-GW TEID of the user plane, P-GW TEID of the control plane and the PDN address information.

415a, the P-GW (private) sends a Create Default Bearer Response to the S-GW including the P-GW address information, P-GW TEID of the user plane, P-GW TEID of the control plane and the user static IP address information. The S-GW stores the P-GW address in the UE context.

416, the S-GW returns a Create Default Bearer Response to the new MME, in which the Create Default Bearer Response includes the PDN address information, S-GW address of the user plane, S-GW TEID of the user plane and S-GW context ID information and further includes the user static IP address, the information of the corresponding APN and the address of the P-GW corresponding to the APN which further corresponds to the user static IP address.

417, the new MME sends to the eNodeB an Attach Accept message including the S-TMSI, PDN address information, TA list, user static IP address list and the corresponding APN list, so as to enable the UE to acknowledge the user static IP address again.

418, the eNodeB sends a Radio Bearer Establishment Request message including the Attach Accept message to the UE.

419, the UE sends a Radio Bearer Establishment Response message including an Attach Complete message to the eNodeB.

420, the eNodeB forwards the Attach Complete message to the new MME, in which the Attach Complete message is included in a control message: Initial Context Setup Complete message of an S1-MME interface. The Initial Context Setup Complete message further includes eNodeB TEID(s) and eNodeB address used for transmitting downlink packet data.

421, the new MME sends an Update Bearer Request message including the eNodeB address and the eNodeB TEID(s) to the S-GW.

422, the S-GW responds the new MME with an Update Bearer Response message, so as to enable the S-GW to send buffered downlink data.

423, after the new MME receives the Update Bearer Response message, if the EPS bearer was established, the MME sends an Update Location Request including the address of the P-GW associated with non-3GPP access mobility to the HSS.

424, the HSS stores the P-GW address and sends an Update Location Response message to the new MME.

Figure 5:
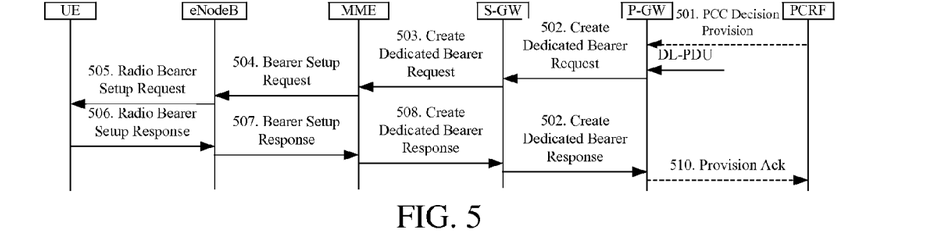
FIG. 5 is a schematic diagram illustrating a P-GW-initiated dedicated bearer establishment procedure according to an embodiment of the present invention.

FIG. 5 shows a P-GW-initiated dedicated bearer establishment procedure according to a preferred embodiment of the present invention. The dedicated bearer establishment procedure adopts the bearer establishment procedure defined in 3GPP TS 23.401. The details are as follows:

501, the PCRF provides a PCC Decision Provision for the P-GW.

502, when a Downlink Packet Data Unit (DL PDU) arrives, the P-GW sends a Create Dedicated Bearer Request message to the S-GW.

503, the S-GW sends a Create Dedicated Bearer Request message to the MME.

504, the MME sends a Bearer Setup Request message to the eNodeB.

505, the eNodeB sends a Radio Bearer Setup Response message to the UE.

506, the UE sends a Radio Bearer Setup Response message to the eNodeB.

507, the eNodeB sends a Bearer Setup Response message to the MME.

508, the MME sends a Create Dedicated Bearer Response message to the S-GW.

509, the S-GW sends a Create Dedicated Bearer Response message to the P-GW.

510, the P-GW sends a PCC Provision ACK message to the PCRF.

Figure 6:
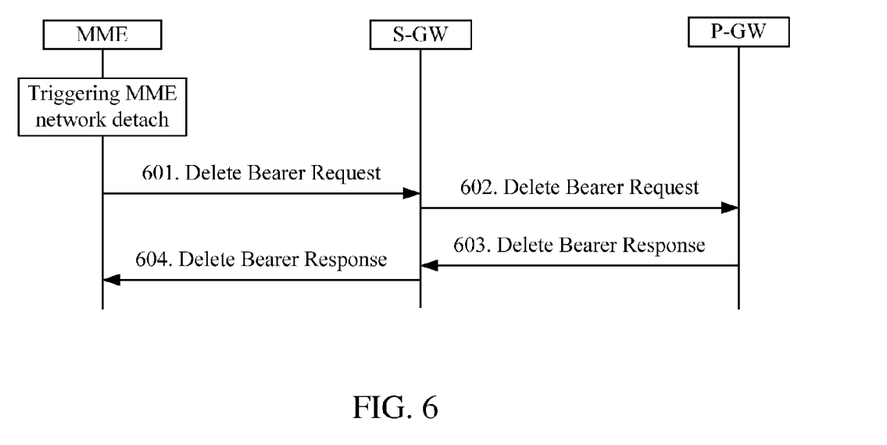
FIG. 6 is a schematic diagram illustrating an MME-initiated bearer information deleting procedure according to an embodiment of the present invention.

FIG. 6 shows an MME-initiated bearer information deleting procedure according to a preferred embodiment of the present invention, in which a UE context releasing procedure initiated by the MME to the S-GW and the P-GW during a UE detach procedure is the same as that defined in 3GPP TS 23.401. The difference is contents of messages in each block. The details are as follows:

601, because of various triggering elements, the MME sends a Delete Bearer Request message to the S-GW, in which the Delete Bearer Request message includes a TEID or a TEID list corresponding to the bearer(s) and may also include the user static IP address. Specifically speaking, if the bearer corresponding to the user static IP address has been established, the Delete Bearer Request message includes just the TEID (the MME stores the TEID identifier information corresponding to the bearer). If the bearer corresponding to the user static IP address has not been established, the Delete Bearer Request message needs to include the user static IP address.

602, after receiving the Delete Bearer Request message, the S-GW searches the UE context information locally stored according to the TEID and sends a Delete Bearer Request message to the P-GW. The Delete Bearer Request message includes the TEID. The P-GW deletes the UE context information. If the Delete Bearer Request message received by the S-GW includes the user static IP address information, keep on using the Delete Bearer Request message to indicate, according to the address of the P-GW corresponding to the user static IP address in the UE context stored, the P-GW to delete the UE context.

603, after successfully deleting the UE context, the P-GW sends a Delete Bearer Response message to the S-GW.

604, after receiving the Delete Bearer Response message from all relevant P-GW indicating that the UE context has been successfully deleted, the S-GW sends a Delete Bearer Response message to the MME, indicating that the P-GW has successfully deleted the UE context.

Figure 7:
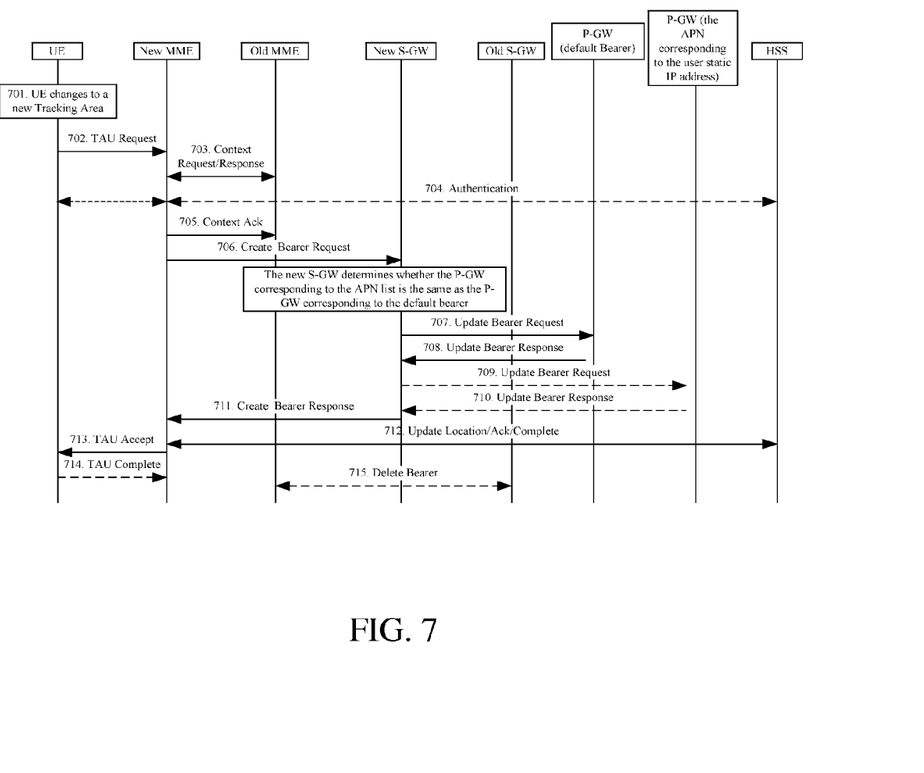
FIG. 7 is a schematic diagram illustrating a TA update procedure according to an embodiment of the present invention.

FIG. 7 shows a TA update procedure according to an embodiment of the present invention, in which a relevant processing procedure for the user static IP address is included. The details are as follows:

701, the UE detects that it has entered a new TA.

702, the UE sends a TAU request message to a new MME, in which the TAU request message includes an S-TMSI, an old TAI and an active flag.

703, the new MME initiates a Context Request/Response procedure to the old MME, obtains the MME context of the UE from the old MME. The MME context includes: IMSI, authentication vector, bearer context, S-GW signalling address and TEID, subscription data, etc. The user static IP address and the information of the corresponding APN belong to the subscription data, and P-GW address belongs to the bearer context.

704, an Authentication procedure among the UE, MME and the HSS is performed.

705, the new MME sends a Context ACK message to the old MME.

706, the new MME constructs an MME context for the UE, and determines whether to relocate the S-GW. If it is determined to relocate the S-GW, the MME sends a Create Bearer Request message to a new S-GW, in which the Create Bearer Request message carries: IMSI, bearer context, MME context identifier, subscribed user static IP address list and the information of the corresponding APN.

The new S-GW analyzes the user static IP address list and the corresponding APN list. If the P-GW corresponding to the APN list is the same as the P-GW corresponding to the default bearer, proceeding to blocks 7 and 8 and omitting blocks 9 and 10. If the P-GW or P-GW list corresponding to the APN list is different from the P-GW corresponding to the default bearer, it is further required to perform blocks 9 and 10.

707, the new S-GW sends an Update Bearer Request message to the default P-GW, in which the Update Bearer Request message includes the S-GW address, S-GW TEID, and the user static IP address (or user static IP address list) information.

708, the default P-GW stores the user static IP address information list, and updates the bearer context information, returns an Update Bearer Response message including the P-GW address and the TEID information.

The new S-GW analyzes the user static IP address list and the corresponding APN list. If the P-GW corresponding to the APN list is the same as the P-GW corresponding to the default bearer, proceeding to blocks 707 and 708 and omitting blocks 709 and 710. If the P-GW or P-GW list corresponding to the APN list is different from the P-GW corresponding to the default bearer, it is further required to perform blocks 709 and 710.

711, the new S-GW updates the bearer context, records the address of the P-GW corresponding to the user static IP address list, such that bearer packet data unit from the eNodeB may be routed to the P-GW (the P-GW has already established the bearer), and sends a Create Bearer Response message to the new MME.

712, an Update Location/Ack/Complete procedure between the new MME and the HSS, including a procedure of the HSS informing the old MME to delete the location information, is performed.

713, after receiving validly updated subscription data, the new MME validates the UE's presence in the new TA. After all checks succeed, the new MME sends a TAU Accept message including S-TMSI and TA list to the UE. If the Active flag has been set, the user plane setup procedure can be activated.

714, if the S-TMSI is changed, the UE responses the MME with a TAU Complete message indicating that the UE has received the S-TMSI.

715, the old MME and the old S-GW delete bearer resources (Delete Bearer) there between.

As described above, the above method is also applicable for addressing by user static IP address in the LTE/SAE system when the user attaches by non-3GPP access system. In this case, the user subscription data is downloaded to an A-GW of the non-3GPP system through a 3GPP Authentication Authorization Accounting (AAA) server. The A-GW initiates, according to the user static IP address and the information of the corresponding APN in the subscription data, an IP bearer establishment procedure to the corresponding P-GW, or informs the P-GW to store relevant information for facilitating subsequent initialization of dedicated IP bearer establishment.

Embodiments of the present invention also provide a system for supporting addressing by user static IP address in the LTE system. The system includes:

an HSS, adapted to download, when a user attaches to the network, user subscription data including a user static IP address and information of a corresponding APN to an MME;

the MME, adapted to send the user static IP address and the information of the corresponding APN to an S-GW through a Create Default Bearer Request message;

the S-GW, adapted to send the user static IP address and an address of an S-GW serving the user to a P-GW corresponding to the APN; and the P-GW, adapted to establish a default bearer according to the user static IP address, the APN information and the address of the S-GW serving the user.

The MME may obtain the address of the P-GW corresponding to the APN which further corresponds to the user static IP address from the downloaded subscription data, or by analyzing the downloaded APN information. Then the MME sends the obtained address of the P-GW to the S-GW through the Create Default Bearer Request message. Or, the S-GW may request the DNS to analyze the information of the APN received from the MME, so as to obtain the address of the P-GW corresponding to the APN which further corresponds to the user static IP address.

In addition, if the corresponding APN is the same as the default APN or there is only one APN, the S-GW may send the user static IP address, the information of the corresponding APN and the address of the S-GW serving the user to the P-GW corresponding to the default APN through the Create Default Bearer Request message. If the corresponding APN is different from the default APN, the S-GW may send the user static IP address, the information of the corresponding APN and the address of the S-GW serving the user to the P-GW corresponding to the corresponding APN information through the Create Default Bearer Request message or a Notification Private Context Request message.

When downlink packet data arrives at the P-GW, the P-GW determines whether a corresponding default bearer has been established. If the default bearer has been established and is able to meet a QoS requirement of the downlink packet data, the P-GW forwards the downlink packet data through the established default bearer; otherwise, the P-GW establishes a corresponding dedicated bearer according to the user static IP address, the information of the corresponding APN and the address of the S-GW serving the user, and forwards the downlink packet data through the established dedicated bearer.

When the user detaches from the network, the MME determines whether a default bearer corresponding to the user static IP address was established. If the default bearer was established, the MME sends a delete bearer request message carrying the user static IP address to the S-GW; otherwise, the MME sends a delete bearer request message carrying a TEID or a TEID list corresponding to the bearer(s) to the S-GW. The S-GW sends the delete bearer request message received to the P-GW. If the received delete bearer request message carries the user static IP address, the P-GW deletes context related to the user static IP address. If the received delete bearer request message carries the TEID or the TEID list corresponding to the bearer(s), the P-GW deletes the context related to the TEID or the TEID list.

When the user performs a tracking area update or an S-GW relocation procedure, the MME sends the user static IP address and the information of the corresponding APN to the S-GW through a Create Default Bearer Request message. After receiving the Create Default Bearer Request message, if the APN corresponding to the user static IP address is the same as the default APN, the S-GW starts an update bearer request procedure to the P-GW corresponding to the default APN, so as to update the context information stored in the P-GW. If the APN corresponding to the user static IP address is different from the default APN, the S-GW triggers the update bearer request procedure or a Notification Private Context request procedure to the P-GW corresponding to the APN which further corresponds to the user static IP address, so as to update the context information stored in the P-GW.

Embodiments of the present invention also provide an MME, an S-GW and a P-GW in the system for supporting addressing by the user static IP address in the LTE system.

The MME includes: a first module, adapted to download from an HSS user subscription data including a user static IP address and information of a corresponding APN; a second module, adapted to send the user static IP address and the information of the corresponding APN to an S-GW through a Create Default Bearer Request message.

If the user subscription data further includes an address of a P-GW corresponding to the APN which further corresponds to the user static IP address, the second module above is further adapted to send the address of the P-GW corresponding to the APN which further corresponds to the user static IP address to the S-GW.

If the user subscription data does not include the address of the P-GW corresponding to the APN which further corresponds to the user static IP address, the MME may further include a third module, adapted to analyze the downloaded information of the APN, so as to obtain the address of the P-GW corresponding to the APN which further corresponds to the user static IP address. At this time, the second module is further adapted to send the address of the P-GW corresponding to the APN which further corresponds to the user static IP address obtained after analyzing to the S-GW through the Create Default Bearer Request message.

The S-GW provided by the embodiment of the present invention includes: a first module, adapted to receive a user static IP address and information of a corresponding APN from an MME; a second module, adapted to send the received user static IP address, the information of the corresponding APN and the address of the S-GW serving the user to a P-GW corresponding to the APN which further corresponds to the user static IP address. The S-GW may further include a third module, adapted to request a DNS to analyze the received information of the APN to obtain the address of the P-GW corresponding to the APN which further corresponds to the user static IP address.

The P-GW provided by the embodiment of the present invention includes: a first module, adapted to establish a default bearer according to a user static IP address, information of a corresponding APN and an address of an S-GW serving the user received from an S-GW. The P-GW may further include a second module, adapted to determine, when downlink packet data destined for the user static IP address arrives, whether a corresponding default bearer has been established, forward the downlink packet data through the established default bearer if the corresponding default bearer has been established and is able to meet a QoS requirement of the downlink packet data, otherwise, the second module is adapted to establish a corresponding dedicated bearer according to the user static IP address, the information of the corresponding APN and the address of the S-GW serving the user, and forward the downlink packet data through the dedicated bearer.

The foregoing descriptions are only preferred embodiments of this invention and are not used for limiting the protection scope thereof. Any modifications, equivalent substitutions, improvements, etc, made within the spirit and principle of the invention should be covered within the protection scope of the invention as set by the appended claims.

The invention claimed is:

1. A method for supporting addressing by a user static Internet Protocol (IP) address in a Long Term Evolution (LTE) system, comprising:

when a user attaches to a network, downloading, by a Home Subscriber Server (HSS), user subscription data comprising a user static IP address and information of an Access Point Name (APN) corresponding to the user static IP address, and further comprising information of a default APN to a Mobility Management Entity (MME);

sending, by the MME, the user static IP address and the information of the APN corresponding to the user static IP address, and further the information of the default APN to a Serving Gateway (S-GW) through a Create Default Bearer Request message;

if the APN corresponding to the user static IP address is the same as the default APN or there is only one APN, sending, by the S-GW, the user static IP address, the information of the APN corresponding to the user static IP address and the address of the S-GW serving the user to a Packet Data Network Gateway (P-GW) corresponding to the default APN through the Create Default Bearer Request message; and if the APN corresponding to the user static IP address is different from the default APN, sending, by the S-GW, the user static IP address, the information of the APN corresponding to the user static IP address and the address of the S-GW serving the user to the P-GW, which corresponds to the information of the APN corresponding to the user static IP address through the Create Default Bearer Request message; and establishing, by the P-GW, a default bearer according to the user static IP address, the information of the APN corresponding to the user static IP address and the address of the S-GW serving the user.

2. The method according to claim 1, wherein the user subscription data further comprises an address of the P-GW corresponding to the APN which corresponds to the user static IP address; and the Create Default Bearer Request message sent by the MME to the S-GW further comprises the address of the P-GW corresponding to the APN which corresponds to the user static IP address.

3. The method according to claim 1, further comprising:
analyzing, by the MME, the downloaded information of the APN to obtain an address of the P-GW corresponding to the APN which corresponds to the user static IP address; and sending, by the MME, the obtained address of the P-GW corresponding to the APN which corresponds to the user static IP address to the S-GW through the Create Default Bearer Request message.

4. The method according to claim 1, further comprising:
requesting, by the S-GW, a Domain Name Server (DNS) to analyze the information of the APN received from the MME to obtain an address of the P-GW corresponding to the APN which corresponds to the user static IP address.

5. The method according to claim 1, further comprising:
when downlink packet data destined for the user static IP address arrives, determining, by the P-GW, whether a corresponding default bearer has been established, if the default bearer has been established and the default bearer is able to meet a Quality of Service (QoS) requirement of the downlink packet data, forwarding the downlink packet data through the established default bearer; if the default bearer has not been established, or the established default bearer fails to meet the QoS requirement of the downlink packet data, establishing a corresponding dedicated bearer according to the user static IP address, the information of the APN corresponding to the user static IP address and the address of the S-GW serving the user, and forwarding the downlink packet data through the dedicated bearer.

6. The method according to claim 1, further comprising:
when the user detaches from the network, determining, by the MME, whether a bearer corresponding to the user static IP address was established, if the bearer was established, sending the user static IP address to the S-GW through a Delete Bearer Request message, sending, by the S-GW, the user static IP address to the P-GW through a Delete Bearer Request message, and deleting, by the P-GW, context related to the user static IP address; otherwise, informing the P-GW to delete the context related to the user static IP address through carrying a Tunnel Endpoint identifier (TEID) or a TEID list corresponding to the bearer in a Delete Bearer Request message destined for the S-GW.

7. The method according to claim 1, further comprising:
when the user performs tracking area update, sending, by the MME, the user static IP address and the information of the corresponding APN to the S-GW through a Create Default Bearer Request message.

8. The method according to claim 1, further comprising:
when the user performs an S-GW relocation procedure, sending, by the MME, the user static IP address and the information of the APN corresponding to the user static IP address to the S-GW through a Create Default Bearer Request message.

9. The method according to claim 7, further comprising:
after receiving the Create Default Bearer Request message, if the APN corresponding to the user static IP address is the same as the default APN or there is only one APN, performing, by the S-GW, an update bearer request procedure to the P-GW corresponding to the default APN to update context information stored in the P-GW; if the APN corresponding to the user static IP address is different from the default APN, performing, by the S-GW, the update bearer request procedure to the P-GW corresponding to the APN which corresponds to the user static IP address so as to update the context information stored in the P-GW.

10. A system for supporting addressing by a user static Internet Protocol (IP) address in a Long Term Evolution (LTE) system, comprising:

a Home Subscriber Server (HSS), adapted to download, when a user attaches to a network, user subscription data comprising a user static IP address and information of an Access Point Name (APN) corresponding to the user static IP address, and further comprising information of a default APN to a Mobility Management Entity (MME);

the MME, adapted to send the user static IP address and the information of the APN corresponding to the user static IP address, and further the information of the default APN to a Serving Gateway (S-GW) through a Create Default Bearer Request message;

the S-GW, adapted to send, if the APN corresponding to the user static IP address is the same as the default APN or there is only one APN, the user static IP address, the information of the APN corresponding to the user static IP address and the address of the S-GW serving the user to a Packet Data Network Gateway (P-GW) corresponding to the default APN through the Create Default Bearer Request message, and send, if the APN corresponding to the user static IP address is different from the default APN, the user static IP address, the information of the APN corresponding to the user static IP address and the address of the S-GW serving the user to the P-GW, which corresponds to the information of the APN corresponding to the user static IP address through the Create Default Bearer Request message; and the P-GW, adapted to establish a default bearer according to the user static IP address, the information of the APN corresponding to the user static IP address and the address of the S-GW serving the user.

11. The system according to claim 10, wherein the MME is further adapted to send an address of the P-GW corresponding to the APN which corresponds to the user static IP address to the S-GW through the Create Default Bearer Request message.

12. The system according to claim 10, wherein the MME is further adapted to analyze the downloaded APN information, and send an address of the P-GW corresponding to the APN which corresponds to the user static IP address obtained by analyzing the downloaded APN information to the S-GW through the Create Default Bearer Request message.

13. The system according to claim 10, wherein the S-GW is further adapted to request a Domain Name Server (DNS) to analyze the information of the APN received from the MME to obtain an address of the P-GW corresponding to the APN which corresponds to the user static IP address.

14. The system according to claim 10, wherein the P-GW is further adapted to determine, when downlink packet data destined for the user static IP address arrives, whether a corresponding default bearer has been established, forward the downlink packet data through the default bearer if the default bearer has been established and is able to meet a Quality of Service (QoS) requirement of the downlink packet data, and establish, if the corresponding default bearer has not been established or the established default bearer fails to meet the QoS requirement of the downlink packet data, a corresponding dedicated bearer according to the user static IP address, the information of the APN corresponding to the user static IP address and the address of the S-GW serving the user and forward the downlink packet data through the dedicated bearer.

15. The system according to claim 10, wherein the MME is further adapted to determine, when the user detaches from the network, whether a default bearer corresponding to the user static IP address was established, send a Delete Bearer Request message carrying the user static IP address to the S-GW if the default bearer was established, and send a Delete Bearer Request message carrying a Tunnel Endpoint Identifier (TEID) or a TEID list corresponding to the bearer to the S-GW if the default bearer was not established;

the S-GW is further adapted to send the received Delete Bearer Request message to the P-GW; and the P-GW is further adapted to delete, if the received Delete Bearer Request message carries the user static IP address, context related to the user static IP address, and delete, if the received Delete Bearer Request message carries the TEID corresponding to the bearer or carries the TEID list corresponding to the bearers, context related to the TEID or the TEID list.

16. The system according to claim 10, wherein the MME is further adapted to send the user static IP address and the information of the APN corresponding to the user static IP address to the S-GW through the Create Default Bearer Request message when the user performs a tracking area update or an S-GW relocation procedure; and after receiving the Create Default Bearer Request message, the S-GW is further adapted to perform, if the APN corresponding to the user static IP address is the same as the default APN, an update bearer request procedure to the P-GW corresponding to the default APN to update context information stored in the P-GW, and trigger, if the APN corresponding to the user static IP address is different from the default APN, the update bearer request procedure to the P-GW corresponding to the APN which corresponds to the user static IP address to update context information stored in the P-GW.

17. A Mobility Management Entity (MME), comprising:

a first module, adapted to download user subscription data comprising a user static Internet Protocol (IP) address and information of an Access Point Name (APN) corresponding to the user static IP address, and further comprising information of a default APN from a Home Subscriber Server (HSS); and a second module, adapted to send the user static IP address and the information of the APN corresponding to the user static IP address, and further the information of the default APN to a Serving Gateway (S-GW) through a Create Default Bearer Request message, wherein the S-GW is adapted to send, if the APN corresponding to the user static IP address is the same as the default APN or there is only one APN, the user static IP address, the information of the APN corresponding to the user static IP address and the address of the S-GW serving the user to a Packet Data Network Gateway (P-GW) corresponding to the default APN through the Create Default Bearer Request message, and send, if the APN corresponding to the user static IP address is different from the default APN, the user static IP address, the information of the APN corresponding to the user static IP address and the address of the S-GW serving the user to the P-GW, which corresponds to the information of the APN corresponding to the user static IP address through the Create Default Bearer Request message, and the P-GW is adapted to establish a default bearer according to the user static IP address, the information of the APN corresponding to the user static IP address and the address of the S-GW serving the user included in the Create Default Bearer Request message received from the S-GW.

18. The MME according to claim 17, wherein the user subscription data further comprises an address of a Packet Data Network Gateway (P-GW) corresponding to the APN which corresponds to the user static IP address; and the second module is further adapted to send the address of the P-GW corresponding to the APN which corresponds to the user static IP address to the S-GW through the Create Default Bearer Request message.

19. The MME according to claim 17, further comprising:
a third module, adapted to analyze the downloaded information of the APN to obtain an address of a P-GW corresponding to the APN which corresponds to the user static IP address, and
the second module is further adapted to send the address of the P-GW corresponding to the APN which corresponds to the user static IP address obtained by analyzing the downloaded information of the APN to the S-GW through the Create Default Bearer Request message.

20. A serving Gateway (S-GW), comprising:
a first module, adapted to receive a user static Internet Protocol (IP) address and information of an Access Point Name (APN) corresponding to the user static IP address, and further information of a default APN from a Mobility Management Entity (MME) through a Create Default Bearer Request message, and
a second module, adapted to send the received user static IP address, the information of the APN corresponding to the user static IP address and an address of a Serving Gateway (S-GW) serving a user to a Packet Date Network Gateway (P-GW) corresponding to the default APN through the Create Default Bearer Request message if the APN corresponding to the user static IP address is the same as the default APN or there is only one APN, and send the user static IP address, the information of the APN corresponding to the user static IP address and the address of the S-GW serving the user to the P-GW, which corresponds to the information of the APN corresponding to the user static IP address through the Create Default Bearer Request message if the APN corresponding to the user static IP address is different from the default APN, wherein
the MME is adapted to download user subscription data comprising the user static IP address and the information of the APN corresponding to the user static IP address, and further comprising the information of the default APN from a Home Subscriber Server (HSS), and
the P-GW is adapted to establish a default bearer according to the user static IP address, the information of the APN corresponding to the user static IP address and the address of the S-GW serving the user included in the Create Default Bearer Request message received from the S-GW.

21. The S-GW according to claim 20, further comprising:
a third module, adapted to request a Domain Name Server (DNS) to analyze the received APN information to obtain an address of the P-GW corresponding to the APN which corresponds to the user static IP address.

22. A Packet Data Network Gateway (P-GW), comprising:
a first module, adapted to establish a default bearer according to a user static Internet Protocol (IP) address, information of an Access Point Name (APN) corresponding to the user static IP address and an address of a Serving Gateway (S-GW) serving the user included in a Create Default Bearer Request message received from the S-GW, wherein
the S-GW is adapted to receive from a Mobility Management Entity (MME) the user static IP address and the information of the APN corresponding to the user static IP address, and further information of a default APN through a Create Default Bearer Request message, send the Create Default Bearer Request message to the P-GW corresponding to the default APN if the APN corresponding to the user static IP address is the same as the default APN or there is only one APN, and send the Create Default Bearer Request message to the P-GW, which corresponds to the information of the APN corresponding to the user static IP address if the APN corresponding to the user static IP address is different from the default APN, and
the MME is adapted to download user subscription data comprising the user static IP address and information of the APN corresponding to the user static IP address, and further comprising the information of the default APN from a Home Subscriber Server (HSS).

23. The P-GW according to claim 22, further comprising:
a second module, adapted to determine, when downlink packet data destined for the user static IP address arrives, whether a corresponding default bearer has been established, forward the downlink packet data through the default bearer if the default bearer has been established and is able to meet a Quality of Service (QoS) requirement of the downlink packet data, and establish, if the default bearer has not been established or the established default bearer fails to meet the QoS requirement of the downlink packet data, a corresponding dedicated bearer according to the user static IP address, the information of the APN corresponding to the user static IP address and the address of the S-GW serving the user and forward the downlink packet data through the dedicated bearer.

* * * * *